(12) United States Patent
Konno et al.

(10) Patent No.: US 7,477,136 B2
(45) Date of Patent: Jan. 13, 2009

(54) THEFT DETERRENT SYSTEM AND METHOD FOR A VEHICLE

(75) Inventors: Takeshi Konno, Saitama (JP); Tadashi Onozuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 11/406,700

(22) Filed: Apr. 19, 2006

(65) Prior Publication Data

US 2006/0238295 A1    Oct. 26, 2006

(30) Foreign Application Priority Data

Apr. 26, 2005  (JP)  ............................. 2005-127836

(51) Int. Cl.
*G06F 7/05* (2006.01)

(52) U.S. Cl. ............... 340/426.28; 307/10.2; 307/10.3; 307/10.5; 340/426.15; 340/426.16; 340/426.36; 340/432; 340/5.31

(58) Field of Classification Search ............ 340/426.11, 340/426.13, 426.14, 426.17, 426.28, 426.35, 340/426.36, 432, 5.31, 5.7; 307/10.1, 10.2, 307/10.3, 10.4, 10.5

See application file for complete search history.

(56) References Cited

U.S. PATENT DOCUMENTS

2001/0011942 A1*  8/2001  Yamamoto et al. ......... 340/5.65
2002/0180594 A1   12/2002  Flick
2003/0071520 A1*  4/2003  Hayashi et al. ............ 307/10.3
2003/0210130 A1* 11/2003  Toyomasu et al. ......... 340/5.31
2004/0046452 A1*  3/2004  Suyama et al. ............ 307/10.2
2004/0063477 A1*  4/2004  Konno .................... 455/575.9
2004/0113753 A1*  6/2004  Chen ......................... 340/5.7

FOREIGN PATENT DOCUMENTS

| DE | 19738495 | 3/1998 |
|---|---|---|
| DE | 197 46 608 C 1 | 2/1999 |
| DE | 19838992 | 3/2000 |
| GB | 2 329 053 A | 3/1999 |
| JP | 2001-012123 | 1/2001 |
| JP | 2001-349117 | 12/2001 |
| JP | 2004-114835 | 4/2004 |
| JP | 2004-114860 | 4/2004 |

* cited by examiner

*Primary Examiner*—Brent Swarthout
(74) *Attorney, Agent, or Firm*—Carrier, Blackman & Associates, P.C.; William D. Blackman; Joseph P. Carrier

(57) ABSTRACT

A vehicle theft deterrent system includes a smart card key system. The theft deterrent system is adapted to output a warning sound from a buzzer upon detection of a vibration of a predetermined value or larger by a vibration sensor. The buzzer prevented from operating at a time of unlocking a seat or unlocking a fuel lid. When an on-board device detects that a seat unlocking switch, for example, has been operated and upon success of mutual authentication after communication with a portable electronic key, the on-board device switches the state of operation of a buzzer into a non-operable state. Therefore, when a user who carries a regular portable electronic key does not want operation of the buzzer, the buzzer can be positively switched to the non-operable state.

16 Claims, 9 Drawing Sheets

THEFT DETERRENT SYSTEM AND METHOD FOR A VEHICLE

CROSS-REFERENCE TO RELATED APPLICATIONS

The present invention claims priority under 35 USC 119 based on Japanese patent application No. 2005-127836, filed on Apr. 26, 2005. The subject matter of this priority document is incorporated by reference herein.

BACKGROUND OF THE INVENTION

1. Field of the Invention

The present invention relates to a theft deterrent system for a vehicle with a vehicular electronic key system applied thereto which permits, for example, starting of an engine of the vehicle when an on-board device judges that this request for starting the engine is a request from a regular user-carried portable electronic key as a result of radio intercommunication between the portable electronic key and the on-board device and subsequent collation of an identification code (ID). Particularly, the present invention is concerned with a theft deterrent system for a vehicle suitable for application to a motorcycle or the like, on which is mounted a warning device for the prevention of theft.

2. Description of the Background Art

In a conventional vehicular electronic key system, a starting switch is attached to a four-wheeled vehicle whereby the vehicle is turned on. Specifically, the starting switch may be attached to, for example, a door handlebar or a trunk lid. When a user operates the starting switch, communication with the portable electronic key begins, then collation is made between ID transmitted from the portable electronic key and an ID registered in the on-board device and, for example, locked doors are unlocked upon coincidence of both IDs. This type of system is disclosed, for example, in JP-A No. 349117/2001.

In JP-A No. 349117/2001, it is disclosed that the starting switch is also attached to an ignition knob. When the user operates the ignition knob after getting on the four-wheeled vehicle, the on-board device again communicates with the portable electronic key, followed by collation of IDs for approval of starting the engine. Then, upon coincidence of IDs, the engine starts.

Thus, in the conventional vehicular electronic key system for a four-wheeled vehicle, the presence of a regular portable electronic key is an essential condition for unlocking doors and for starting the engine.

There has been proposed a vehicular electronic key system for use in a motorcycle in which random numbers are generated on the basis of the starting time data taken after turning ON a power supply of an immobilizer until start of an engine, then information peculiar to the key is encrypted on the basis of the random numbers to generate an authentication key and an authentication code. Authentication is performed using the authentication key and the authentication code, whereby the prevention of theft can be positively effected. This type of vehicular electronic key system is disclosed, for example, in JP-A No. 12123/2001.

An excellent vehicular electronic key system has been proposed for a motorcycle or the like in which a warning lamp is turned ON in the event that a user happens to drop a portable electronic key during a vehicle stop or when the vehicle is in motion, thereby diminishing the probability of loss of the portable electronic key. This type of vehicular electronic key system is disclosed, for example, in JP-A No. 114860/2004.

Further, a vehicular electronic key system for a motorcycle has been proposed including a system with a theft deterrent system installed therein. This type of vehicular electronic key system is disclosed, for example, in JP-A No. 114835/2004.

In the theft deterrent system described in JP-A No. 114835/2004, a vibration sensor is attached to the vehicle. When the proper authentication procedure is not made between an on-board device and a portable electronic key, for example when a main switch is in a locked state, and when it is detected by the vibration sensor that the vehicle body was vibrated to a greater extent than a predetermined level, then a buzzer is operated to output a warning sound, thereby preventing the occurrence of theft.

However, in the vehicle with the above-described theft deterrent system mounted thereon, vibration is detected by the vibration sensor at other times when operations are performed with the main switch in the locking position. For example, during fuel supply, which may be performed with the main switch in a locked state, if the value of the detected vibration is not smaller than a predetermined value, a warning sound issues from the buzzer.

The present invention has been accomplished in connection with such a technique, and it is an object of the invention, to provide a theft deterrent system for a vehicle which permits a warning device to be positively switched to a non-operable state when a user, who carries a regular portable electronic key, does not want operation of the warning device.

It is another object of the present invention to provide a theft deterrent system for a vehicle which permits a warning device to be positively switched to an operation stand-by state when a user, who carries a regular portable electronic key, wants to bring the warning device into the operation stand-by state.

SUMMARY

According to the present invention, a theft deterrent system is provided for a vehicle. The theft deterrent system includes a vehicular electronic key system having an on-board device, and a portable electronic key for communicating with the on-board device and making mutual authentication. The theft deterrent system also includes a warning device connected to the on-board device, and a user operation device. The user operation device is connected to the on-board device and is adapted to be operated by a user for performing a predetermined operation. When the on-board device detects that the user operation device has been operated, the on-board device communicates with the portable electronic key and, upon success of mutual authentication, switches the warning device into an operation stand-by state or a non-operable state in accordance with the contents of the operation of the user operation device.

Thus, according to the present invention, when the on-board device detects that the user operation device has been operated, the on-board device communicates with the portable electronic key and, upon success of mutual authentication, switches the warning device to the operation stand-by state or the non-operable state in accordance with the contents of the operation of the user operation device. Therefore, when the user who carries the regular portable electronic key does not want operation of the warning device, it is possible to positively switch the warning device to the non-operable state. Moreover, when the user, who carries the regular portable electronic key, wants to bring the warning device into the operation stand-by state, it is possible to positively switch the warning device to the operation stand-by state.

When the user operation device is a knob-integrated type main switch capable of being switched between a locked knob position and an unlocked knob position by operation of the knob, and when the on-board device detects a switched operation of the knob from the locked position to the unlocked position, then the on-board device switches the warning device from the operation stand-by state to the non-operable state, so that the user who carries the regular portable electronic key never operates the warning device when utilizing the vehicle.

Likewise, when the user operation device is a motorcycle's seat unlocking switch or a motorcycle's console box unlocking switch, and when the on-board device detects that the seat unlocking switch or the console box unlocking switch has been operated, the on-board device switches the warning device from the operation stand-by state to the non-operable state, whereby the warning device does not operate when the user who carries the regular portable electronic key operates the seat unlocking switch or the console box unlocking switch.

In this case, the on-board device may be constructed so as to switch the warning device from the non-operable state to the operation stand-by state when the system remains in an unlocked state for a predetermined time after switching the warning device from the operation stand-by state to the non-operable state. Statistically, the time taken to unlock the seat and use a luggage box (a receptacle box for a helmet or the like) which underlies the seat, or the time taken to unlock and use the console box is normally a predetermined time, e.g., about 20 to 300 seconds. Therefore, if the unlocked state continues longer than the predetermined time, the warning device operates. Thus, the theft preventing performance is improved. This predetermined time may be made to be adjustable by the user.

When the user operation means is a fuel lid unlocking switch, and when the on-board device detects that the fuel lid unlocking device has been operated, the on-board device switches the warning device from the operation stand-by state to the non-operable state, whereby the warning device can be positively brought to the non-operable state during fuel supply.

Further, when the user operation means is an engine stop switch of a motorcycle, and when the on-board device detects that the engine stop switch has been turned ON, the on-board device switches the warning device from the operation stand-by state to the non-operable state, whereby the warning device can be positively brought to the non-operable state in the event of an emergency engine stop.

Switching the warning device from the operation stand-by state to the non-operable state by the on-board device can be done by stopping the supply of electric power to the warning device or by transmitting a warning cancel code to the warning device.

According to the present invention, when the on-board device detects that the user operation device has been operated, the on-board device communicates with the portable electronic key and, upon success of mutual authentication, switches the warning device into the operation stand-by state or the non-operable state in accordance with the contents of the operation of the user operation device. Therefore, the warning device can be positively brought to the non-operable state when the user, who carries the regular portable electronic key, does not want operation of the warning device.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the inventive theft deterrent system for a vehicle will now be described in some detail, with reference to the drawings. A motorcycle is used as an example of the vehicle which incorporates the theft deterrent system. It should be understood that only structures considered necessary for clarifying the present invention are described herein. Other conventional structures, and those of ancillary and auxiliary components of the system, are assumed to be known and understood by those skilled in the art.

Figure 1:
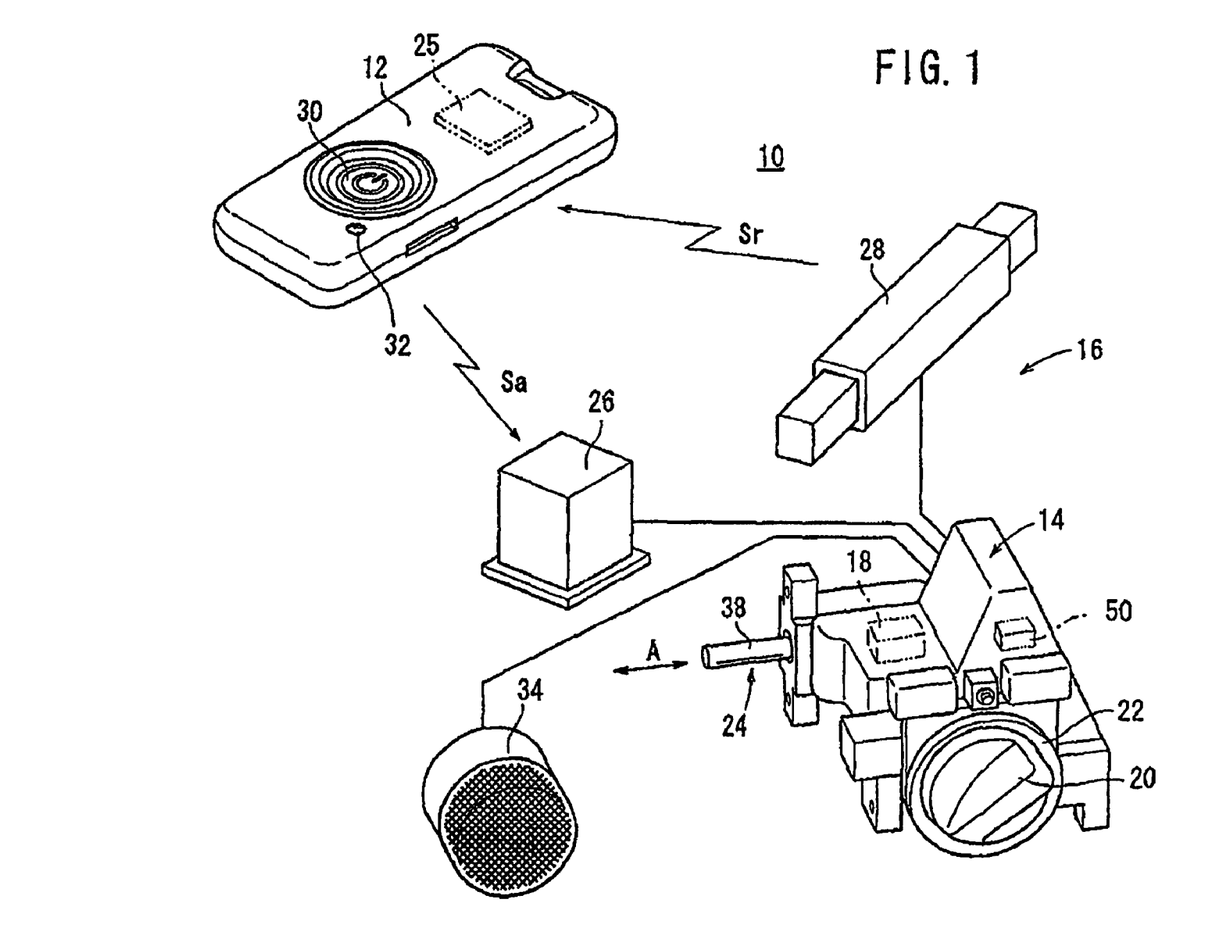
FIG. 1 is a schematic construction diagram showing a vehicular electronic key system.

FIG. 1 is a schematic construction diagram of a vehicular electronic key system 10 applied to the motorcycle. As is seen in FIG. 1, the vehicular electronic key system 10 is generally composed of a user-carried portable electronic key 12 and an on-board device 16 which includes a handlebar lock module mounted on the vehicle.

An electronic control unit (ECU) 18 which is a controller, a main switch 22 provided with a main switch knob 20, and a handlebar lock mechanism 24, are integrally arranged in the handlebar lock module 14. Further, a UHF (Ultra High Frequency) receiver 26 and an LF (Low Frequency) transmitting antenna 28 are connected to the handlebar lock module 14 through interior wiring. In this embodiment, the handlebar lock module 14, the UHF receiver 26 and the LF transmitting antenna 28 constitute the on-board device 16 in the vehicular electronic key system 10.

The portable electronic key 12 is used as a so-called smart card system having a card-shaped profile and including an ECU 25 in the form of an IC chip incorporated therein. This construction of the portable electronic key 12 may be changed to a construction having a key-shaped profile and incorporating an IC chip therein.

The portable electronic key 12 includes an on-off switch 30 and an on-off indication lamp 32. By pushing the on-off switch 30 for one second or longer (pushing long), the vehicular electronic key system as embodied by the smart card system 10 can be switched ON or OFF under control by the ECU 25. By pushing the on-off switch 30 lightly and/or briefly (pushing short), the present state of operation can be checked. In particular, the present state of operation is indicated by an on-off indication lamp 32, which indicates a particular condition using predetermined illumination times and/or colors. For example, a green light of the on-off indication lamp 32 indicates an ID authentication operable state, and a red light of the on-off indication lamp 32 indicates an ID authentication non-operable state.

A buzzer 34 is provided as a warning device (alarm). The buzzer 34 is further connected to the handlebar lock module 14, and to ECU 18 thereof. Any of various devices is employable as the warning device, whereby the invention is not limited to a buzzer, per se. Possible alternative warning devices include a warning voice output device and a device which utilizes both sound and light.

A vibration sensor 50 is connected to the ECU 18, and is also installed in the interior of the handlebar lock module 14. The vibration sensor 50 detects vibrations applied to the handlebar lock module 14. When a vibration is detected by the vibration sensor 50, and when the value of the detected vibration is a predetermined value or larger, the ECU 18 outputs a warning sound through the buzzer 34 under certain conditions which will be described later.

Other components are also connected to the ECU 18 in the handlebar lock module 14 as will be described later. However, they are not shown in FIG. 1 to reduce the complication of the illustration of the vehicular electronic key system 10.

The handlebar lock mechanism 24 is a constituent of the handlebar lock module 14. A lock pin 38 reciprocatingly projects from or is received within the body of the handlebar lock module 14, as shown by arrow A. The lock pin reciprocates due to actuation by a handlebar lock actuator 36 (to be described later) installed within the handlebar lock mechanism 24.

Figure 2:
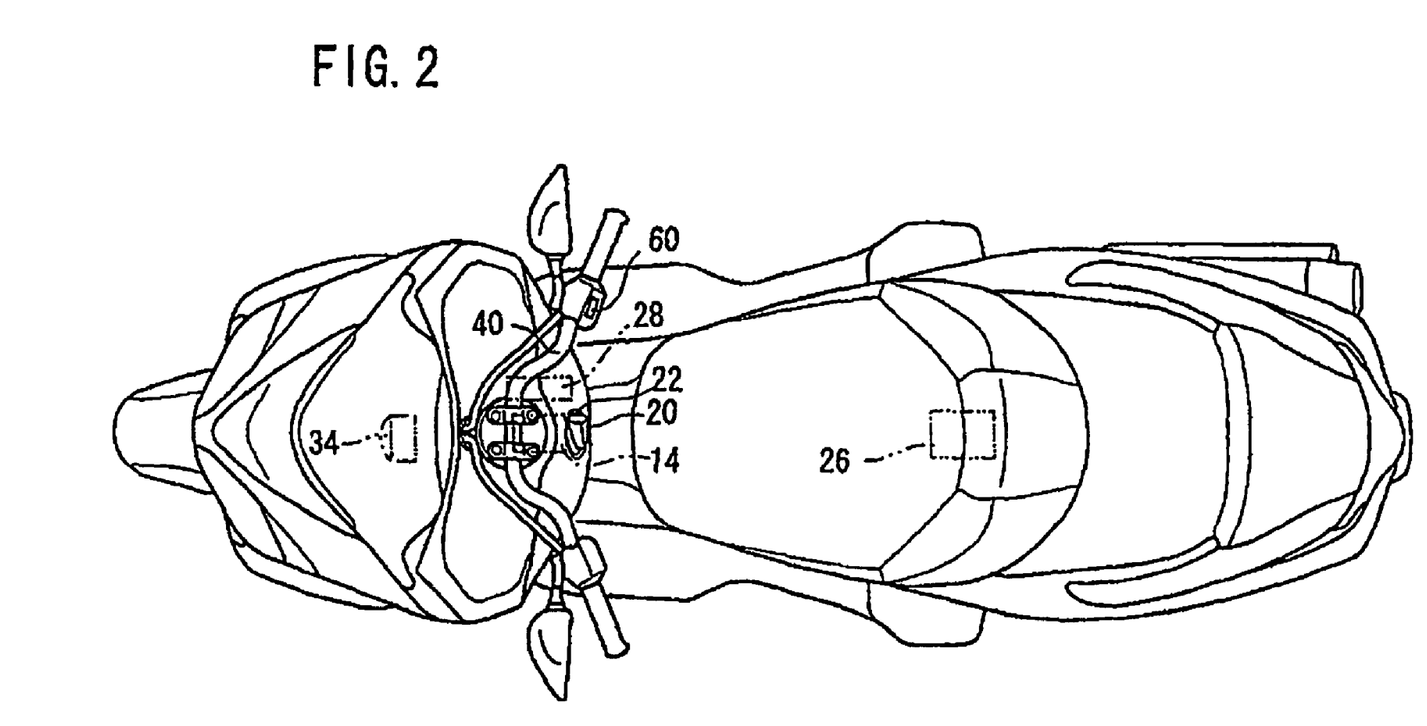
FIG. 2 is a plan view of a vehicle in which an on-board device including a handlebar lock module is installed.
Figure 3:
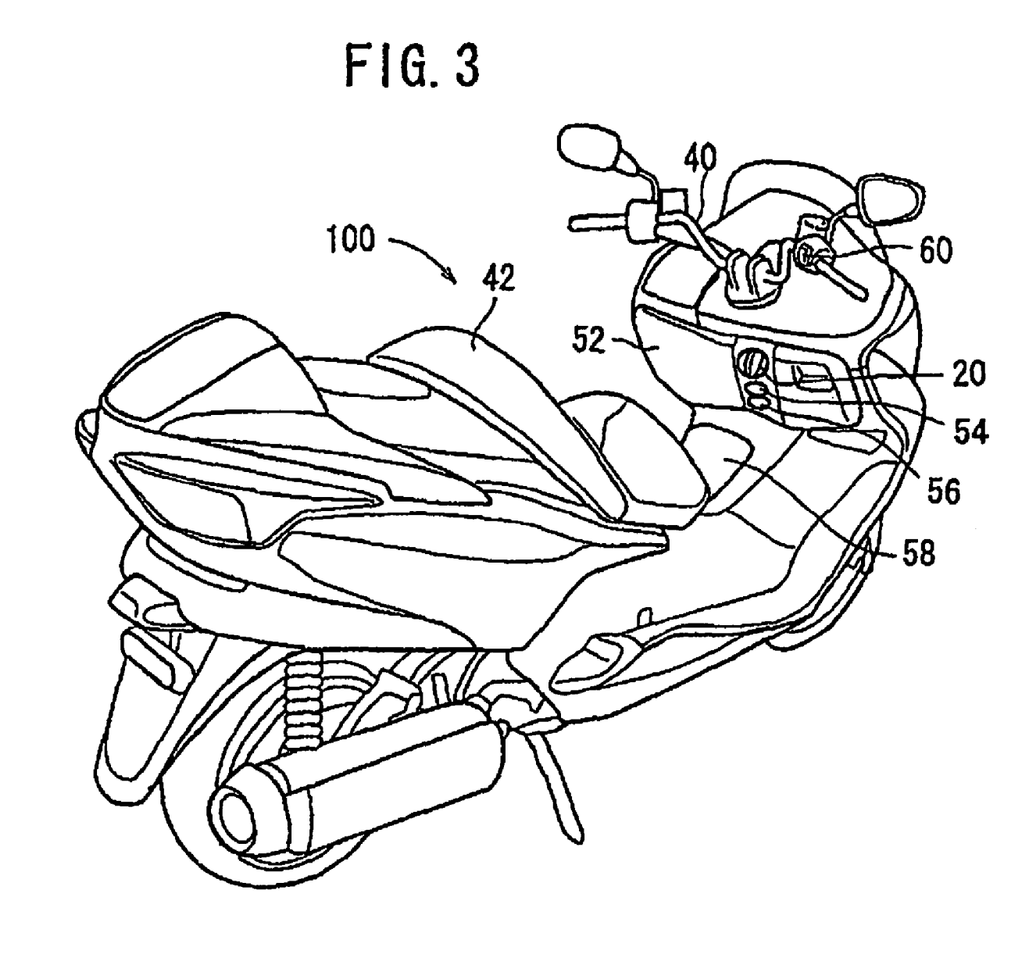
FIG. 3 is a perspective view of the vehicle as seen from an obliquely back side

FIG. 2 is a plan view of a motorcycle 100 which includes the on-board device 16 incorporated therein, the on-board device 16 including the handlebar lock module 14. FIG. 3 is a perspective view of the vehicle 100 as seen from an obliquely back side.

As shown in FIG. 2, the handlebar lock module 14 is fixed to a console portion within a front cover of the vehicle 100 in such a manner that only the main switch knob 20 and a panel portion of the main switch 22 are exposed. The buzzer 34 is also mounted within the front cover. As the buzzer 34 there may be used a so-called genuine part or a non-genuine part having an on-off line connected to a power line, both including an ECU having a authenticating function.

When the lock pin 38 in the handlebar lock mechanism 24 (see FIG. 1) is pushed out, it fixes a rotary shaft corresponding to the handlebar post of handlebars 40 through a cylinder (not shown). When the lock pin 38 is received into the body of the lock module 14, the cylinder is freely rotatable, whereby free rotation of the rotary shaft of the handlebars 40, which is connected to the cylinder, is permitted.

As shown in FIGS. 1 and 2, the LF transmitting antenna 28 is used for a transmitting a request signal Sr, where the request signal Sr is an example of a low frequency signal. The transmitting antenna 28 is fixed at a position near the handlebar lock module 14, and is eventually fixed near the user-operated main switch knob 20. With this arrangement, it is possible to coincide with the sensitivity of the user who thinks that a regular radio signal (request signal Sr) is generating from near the main switch 20.

On the other hand, the UHF receiver 26 includes a receiving antenna for receiving a response signal Sa, where the response signal Sa is a UHF signal from the portable electronic key 12. The UHF receiver is fixed under a seat 42 of the vehicle 100 (see FIG. 2). Since the UHF receiver 26 is thus fixed, when the user (rider of the vehicle 100), who carries the portable electronic key 12, straddles the seat 42, the portable electronic key 12 is sure to fall within a receivable range of the UHF receiver 26.

As shown in FIG. 3, in the console portion of the vehicle 100 there are provided a console box 52, a console box unlocking switch 54 for the console box 52, and a seat unlocking switch 56. A fuel lid 58 is provided in a center cover portion of the vehicle 100. In the vicinity of a right throttle grip there is provided an engine stop switch 60 for stopping the operation of the engine by hand immediately in case of emergency.

Figure 4:
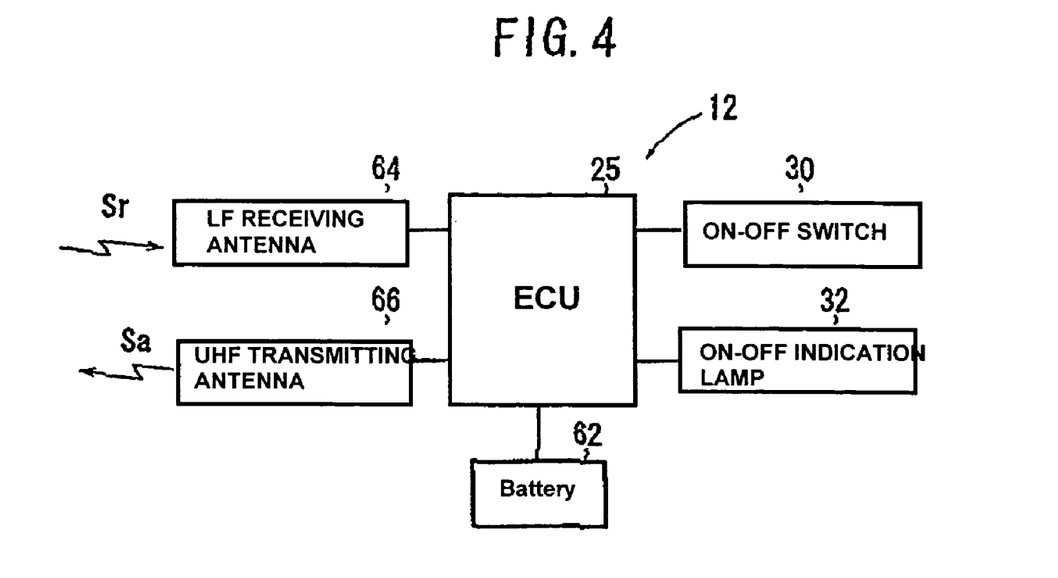
FIG. 4 is a block diagram showing the construction of a portable electronic key.

FIG. 4 is a block diagram of the portable electronic key 12. The portable electronic key 12 is supplied with electric power from a battery 62 such as, for example, a button cell and is provided with an ECU 25 which executes various programs stored in a ROM. An LF receiving antenna 64 for a request signal Sr as an LF signal, an UHF transmitting antenna 66 for a response signal Sa as a UHF signal, the on-off switch 30 and the on-off indication lamp 32 are connected to the ECU 25. The carrier frequency (LF frequency) of the request signal Sr is 100 to 300 [kHz].

Figures 5A, 5B:
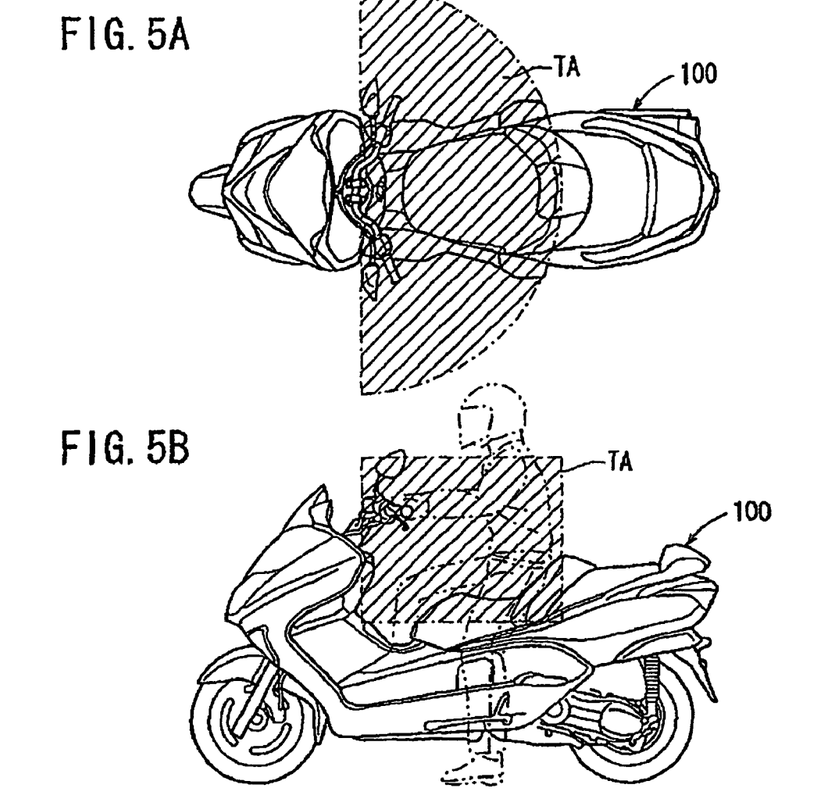
FIG. 5A is an explanatory plan view of a request signal communication distance range.
FIG. 5B is an explanatory side view of the request signal communication distance range.

As indicated by a hatched range (communication distance range TA) in FIGS. 5A and 5B, the communication distance range TA of the request signal Sr transmitted from the LF transmitting antenna 28 in the on-board device 16 with respect to the portable electronic key 12 is a range of 0.8 [m] in radius (the hatched range in FIG. 5A) with the main switch knob 20 (LF transmitting antenna 28) as an origin. Its height is a range (the hatched range in FIG. 5B) of 0.7 to 1.3 [m]. Therefore, as noted above, when the user who carries the portable electronic key 12 straddles the seat of the vehicle 100, the portable electronic key fully falls under the communication distance range TA.

A communication distance range permitting transmission and reception of the response signal Sa as a UHF signal between the portable electronic key 12 which the user carries and the UHF receiver 26 fixed to the underside of the seat 42 of the vehicle 100 is a communication distance range TB (the hatched range in FIG. 5C) of several meters (2.5 [m] in this embodiment), which fully covers the LF signal communication distance range TA.

Again in FIG. 4, the ECU 25 in the portable electronic key 12 makes collation whether the signal fed from the LF receiving antenna 64 is the request signal Sr or not, and if the answer is affirmative, the ECU 25 reads ID data stored in the ROM, then adds an attribute indicative of response to the ID data, modulates the data as transmission data by a carrier wave and transmits the modulated data as the response signal Sa through the UHF transmitting antenna 66. The carrier frequency of this response signal Sa is 200 to 360 [MHz].

Figure 6:
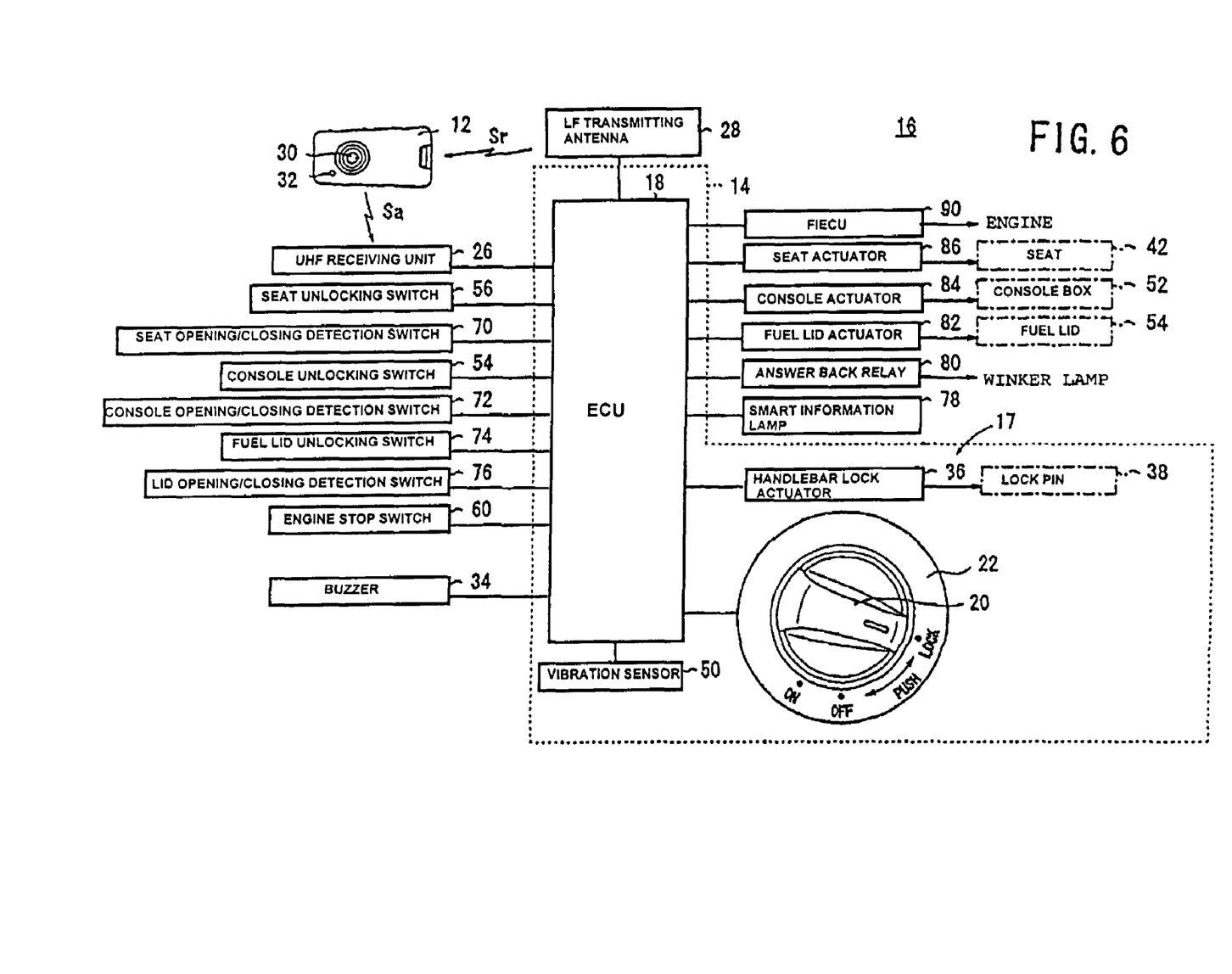
FIG. 6 is a block diagram showing the construction of an on-board device.

FIG. 6 is a block diagram of the on-board device 16 including the handlebar lock module 14. The ECU 18 in the handlebar lock module 14 is constituted for example by a system LSI.

The ECU 18 includes a CPU, a ROM, a RAM, a timer and a clock and fulfills various functions by executing programs stored in the ROM.

The UHF receiver 26, a seat unlocking switch 56, a seat opening/closing detection switch 70, a console box unlocking switch 54, a console box opening/closing detection switch 72, a fuel lid unlocking switch 74, a fuel lid opening/closing detection switch 76, an engine stop switch 60, a buzzer 34, a vibration sensor 50, a main switch 22, a smart information lamp 78, an answer back relay 80, a handlebar lock actuator 36, a fuel lid actuator 82, a console box actuator 84, a seat actuator 86, and an FIECU 90 which is a fuel injection electronic control unit, are connected to the ECU 18.

The main switch knob 20, which is a knob for switching the main switch 22 connected to the ECU 18, can effect switching successively to a LOCK position at which the rotary shaft of the handlebars 40 is fixed through the lock pin 38, a PUSH position at which two-way authentication communication with the portable electronic key 12 is performed when the main switch knob is pushed at the LOCK position, an OFF position of the engine to which the main switch knob can move when the portable electronic key 12 is authenticated, and an ON position at which electric power is fed to the FIECU 90 from an on-board battery (not shown) and the engine is started by operation of a starter switch (not shown) and which is an engine ON position.

The vehicular electronic key system 10 according to this embodiment is basically constructed as above. Next, the operation thereof will be described below in the order of (1) mutual authenticating operation (basic operation) between the portable electronic key 12 and the on-board device 16 which operation is based on the operation of for example the main switch knob 20 in the knob-integrated type main switch 22 and (2) switching control operation between the operation stand-by state and the non-operable state of the buzzer 34 as a warning device (operation of a principal portion which premises the basis operation).

(1) Mutual authenticating operation between the portable electronic key 12 and the on-board device 16 based on the operation of the main switch knob 20, etc.:

When the user gets on the vehicle 100 for example during parking or stopping of the vehicle 100, then approaches the vehicle 100 while carrying the portable electronic key 12 and pushes the main switch knob 20 in the LOCK position, the ECU 18 reads request data from the ROM at every certain time and transmits the data as request signal SR by radio through the LF transmitting antenna 28.

When the radio wave of the request signal Sr is received by the portable electronic key 12 and demodulated, the ECU 25 starts operation, that is, wakes up. At this time, the ECU 25 makes collation for the demodulated request signal Sr and, if the modulated signal is the request signal Sr, the ECU 25 transmits by radio from the UHF transmitting antenna 66 the response signal Sa which includes ID data read from the ROM.

When the response signal Sa is demodulated by the UHF receiver 26 in the on-board device 16, the ECU 18 makes collation whether the signal fed from the UHF receiver 26 is the response signal Sa or not. Further, when the ECU 18 judges that the fed signal is the response signal Sa, it further makes collation whether the ID date included in the response signal Sa coincides or not with the ID data registered in its own ROM.

When the ECU 18 judges that both ID data are coincident with each other, the mutual authentication with the portable electronic key 12 is completed and the main switch 20 is unlocked (is permitted to rotate).

After the unlocking, the smart information lamp 78, which is disposed within a speedometer, is turned ON and the outer periphery of the main switch knob 20 is illuminated with blue light.

Actually, when the main switch knob 20 is pushed in the LOCK position, the ECU 18 outputs request data as described above, but upon arrival of the response signal Sa within a predetermined time after the output of the request data and subsequent ID authentication, the main switch knob 20 is unlocked and at the same time an unlocking signal is outputted to the handlebar lock actuator 36 which constitutes the handlebar lock mechanism 17. Upon receipt of the unlocking signal the handlebar lock actuator 36 causes the lock pin 38 to move so as to be received into the body portion of the handlebar lock module, whereby the rotary shaft of the handlebars 40 is unlocked.

In this state, the main switch knob 20 is in an OFF position, but when it is further turned to an ON position, not only electric power is fed to the FIECU 90 but also the ECU 18 transmits engine ignition permitting ID data read from its own ROM to the FIECU 90. At this time, when mutual authentication between the ECU 18 and the FIECU 90 is completed, the engine assumes a state capable of being started. That is, upon receipt of a start signal from the starter switch (not shown), the engine starts operating and assumes a state able to run.

Next, when the rider gets off the vehicle and the main switch 20 is returned from the ON position to the OFF position, the engine also stops at the same time. When the main switch is returned to the OFF position, the portable electronic key 12 and the handlebar lock module 14 communicate with each other at intervals of one second and the main switch knob 20 is kept unlocked while mutual authentication is valid.

Figure 5C:
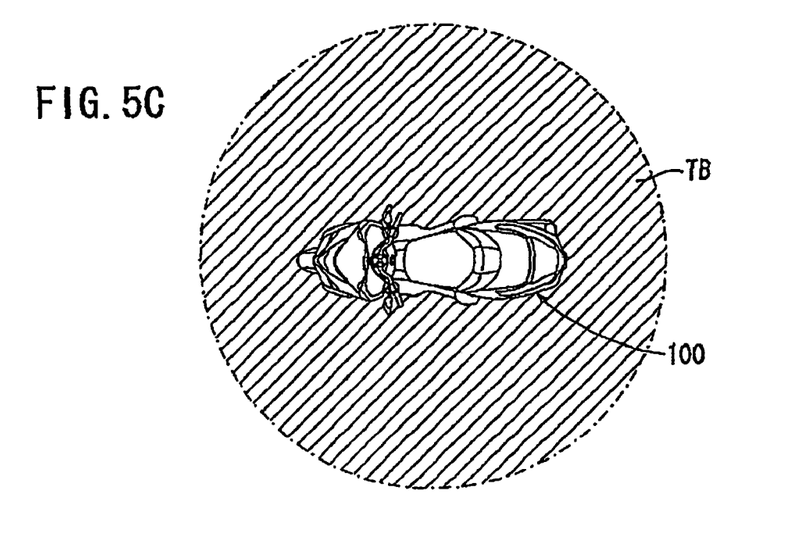
FIG. 5C is an explanatory view of a communication cut-off range in automatic locking.

As shown in the hatched range (communication distance range TB) in FIG. 5C, when the user (portable electronic key 12) moves 2.5 [m] or more away from the center of a wheel base of the vehicle 100, the main switch knob 20 is turned back to the LOCK position to fasten the lock. At the same time, the handlebar lock actuator 36 also operates and the lock pin 38 is brought to its projected position to lock the rotary shaft of the handlebars 40. At this time, the answer back relay 80 is operated to flicker a winker lamp, thereby informing the user in the form of what is called answer back that the main switch knob 20 has turned to the LOCK position (locked state).

Even when the portable electronic key 12 lies within the range of 2.5 [m], the locking operation is performed if this state is left as it is for 20 seconds or more.

(2) Switching control operation between the operation stand-by state and the non-operable state of the buzzer 34 as the warning device:

(2-1) Reference will first be made to conditions "a" to "d" for switching the state of operation of the buzzer 34 from the armed operation stand-by state (the state in which the buzzer 34 outputs a warning sound upon detection of a vibration of a predetermined value or larger by the vibration sensor 50) to the non-operable state (the state in which the buzzer 34 does not output a warning sound even upon detection of a vibration of the predetermined value or larger by the vibration sensor 50). By the state of operation of the buzzer 34 is meant a state in which a warning sound is being outputted from the buzzer 34 in the case where the vibration sensor 50 detects a vibration of the predetermined value or larger).

That is, the buzzer 34 is switched to the non-operable state, the armed operation stand-by state, or the operating state.

Figure 7:
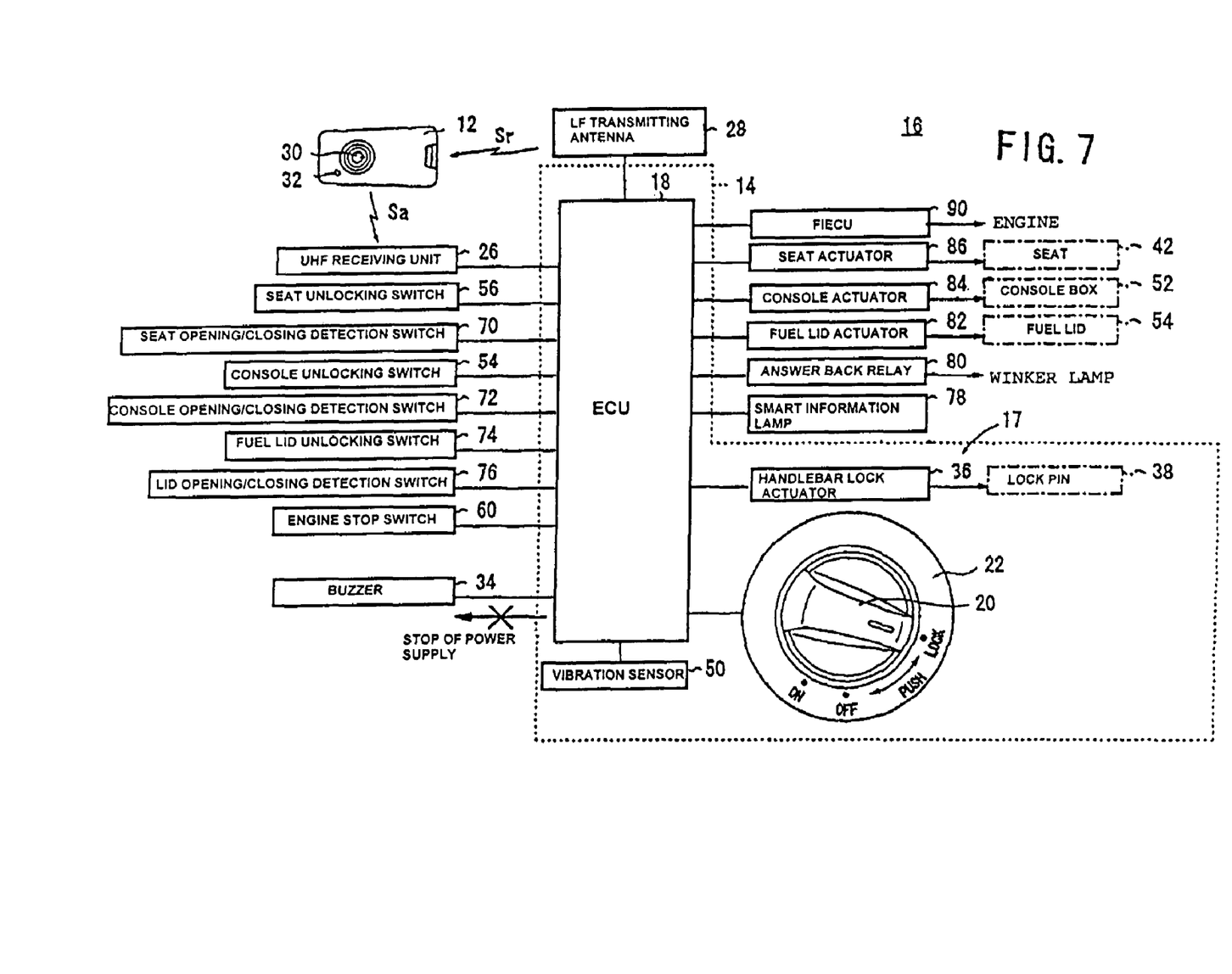
FIG. 7 is a diagram explanatory of how a buzzer is brought into an non-operable state.
Figure 8:
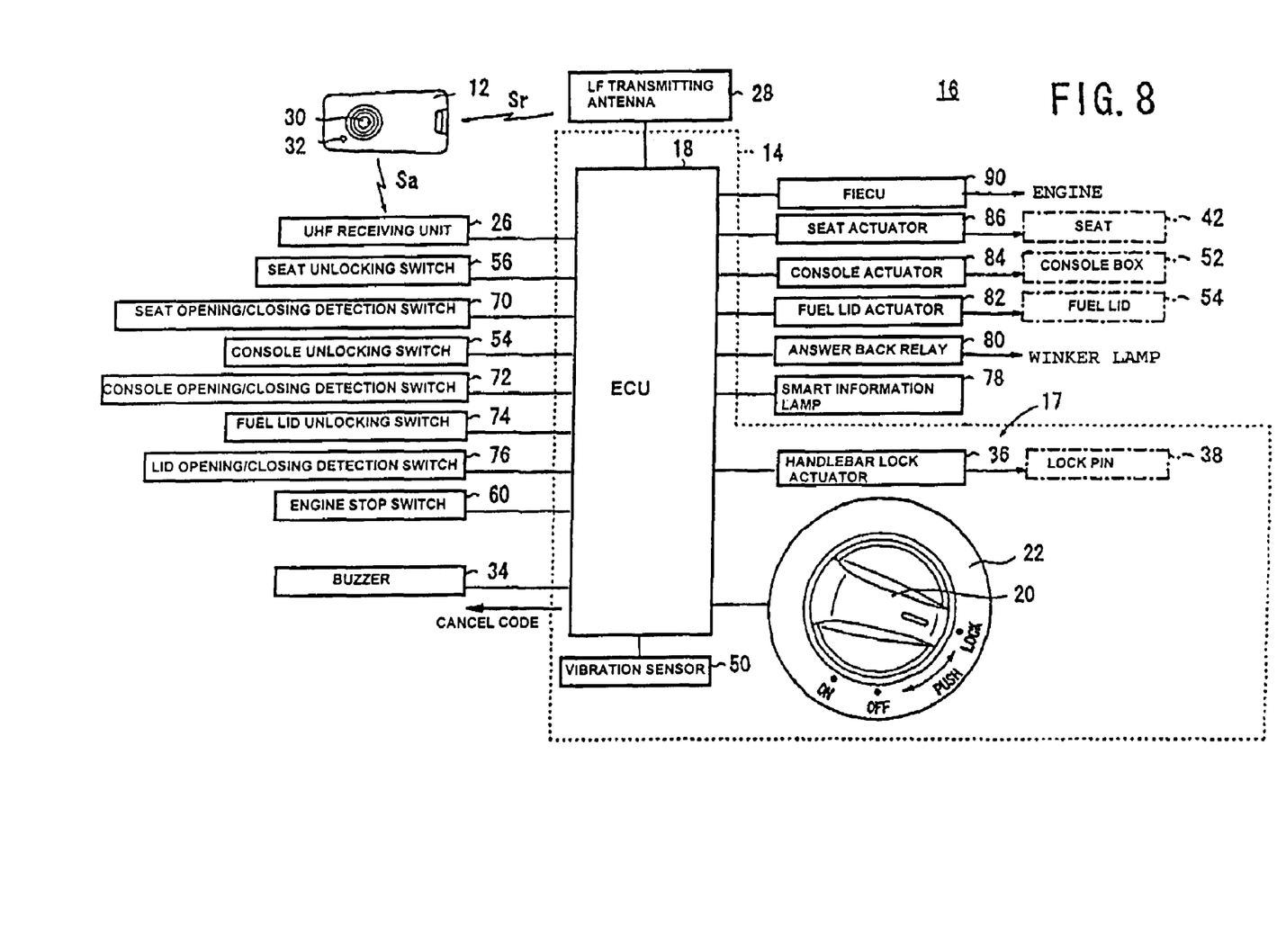
FIG. 8 is another diagram explanatory of how the buzzer is brought into the non-operable state.

"a". Upon success of the above mutual authentication between the on-board device 16 and the portable electronic key 12 and when the main switch knob 20 is switched from the LOCK position as a locking position to the OFF position as an unlocking position, the on-board device 16 (ECU 18 thereof) stops the supply of electric power to the buzzer 34, as shown in FIG. 7. Under such a control, when the user having the regular portable electronic key 12 tries to start the engine of the vehicle 100, since it is not necessary to operate the buzzer 34, the supply of electric power to the buzzer 34 is stopped and switching is made from the operation stand-by state to the non-operable state. In the case where the buzzer 34 is a genuine part capable of being switched from the operation stand-by state to the non-operable state in accordance with an authentication code, a warning cancel code which is an ID code of about 16 bits is transmitted to effect switching into the non-operable state, as shown in FIG. 8.

"b". In the case where the engine stop switch 60 is turned ON to stop the engine when the on-board device 16 detects this turning ON operation, the foregoing mutual authentication is performed between the on-board device 16 and the portable electronic key 12, then upon success of the mutual authentication, the buzzer 34 is switched from the operation stand-by state to the non-operable state, whereby the buzzer 34 can surely be brought into the non-operable state in the event of emergency engine stop.

"c". When the on-board device 16 detects that the seat unlocking switch 56 or the console box unlocking switch 54 has been operated, the on-board device 16 performs the foregoing mutual authentication between it and the portable electronic key 12, then upon success of the mutual authentication, the on-board device 16 switches the buzzer 34 from the operation stand-by state to the non-operable state, whereby when the user who carries the regular portable electronic key 12 operates the seat unlocking switch 56 or the console box unlocking switch 54 for unlocking, the buzzer 34 never operates.

Figure 9:
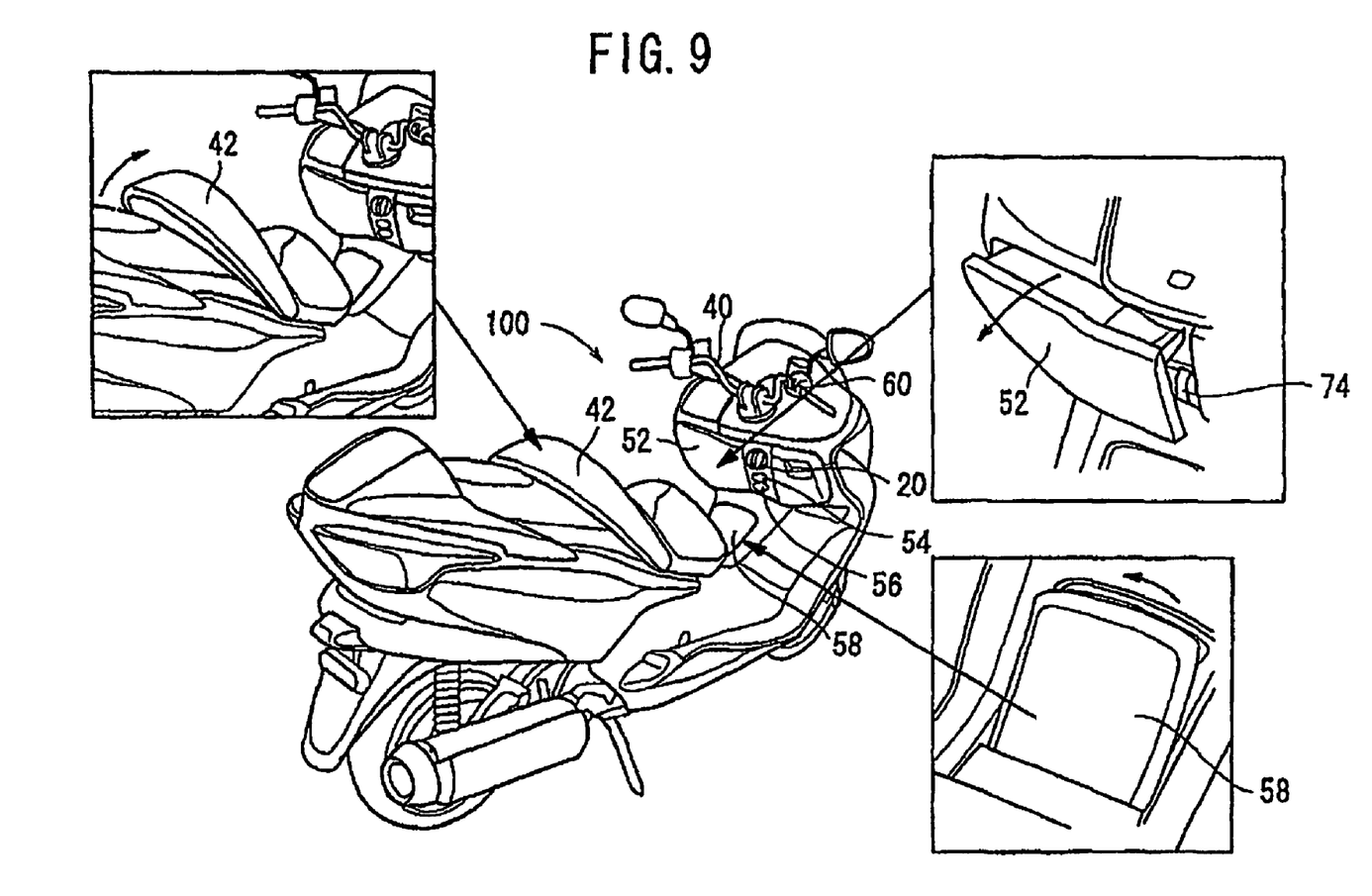
FIG. 9 is a diagram explanatory of how a console box, etc. are unlocked.

Upon success of the mutual authentication, the on-board device 16 unlocks the seat 42 or the console box 52 through the seat actuator 86 or the console box actuator 84. At this time, as shown in FIG. 9, the seat 42 or the console box 52 slightly pops up in the direction of arrow and is unlocked, so that the use can lift the seat 42, then pull out the luggage box (receptacle box) which underlies the seat 42 or pull out the console box and bring it into a state permitting storage or removal.

When the time of duration of the unlocked state set by the timer has elapsed a predetermined time after detecting the operation of the seat unlocking switch 56 or the console box unlocking switch 54 and subsequent switching of the buzzer 34 from the operation stand-by state to the non-operable state, the on-board device 16 may switch the buzzer 34 automatically from the non-operable state again to the operation stand-by state. It has statistically been confirmed that usually the time taken to unlock the seat 42 and use the luggage box which underlies the seat 42 and the time taken to unlock and use the console box 52 are a predetermined time, e.g., 20 to 300 seconds or so. If the unlocked state continues longer than the required time (predetermined time), the buzzer 34 operates, whereby the theft preventing performance is improved. This predetermined time can be changed by operation on the user side. Different predetermined times may be set for the seat unlocking switch 56 and the console unlocking switch 54, respectively.

When it is detected by the seat opening/closing detection switch 70 or the console box opening/closing detection switch 72 that the seat 42 or the console box 52 has been closed, the on-board device 16 brings back the state of operation of the buzzer 34 from the non-operable state to the operation stand-by state.

"d". In the vehicle 100 related to this embodiment, as shown in FIG. 9, when the console box 52 is unlocked and pops up, the fuel lid unlocking switch 74 appears under the lid of the console box 52, permitting the user to operate the switch. Of course, the fuel lid unlocking switch 74 may be disposed not within the console box 52 but at any position of the surface of the vehicle 100.

When the on-board device 16 detects that the user has operated the fuel lid unlocking switch 74 and upon success of mutual authentication with the portable electronic key 12, the fuel lid 58 pops up through the fuel lid actuator 82, as shown in FIG. 9. At this time, the buzzer 34 is brought into the non-operable state from the operation stand-by state. Under such a switching control, the buzzer 34 can surely be brought into the non-operable state at the time of fuel supply. When it is detected by the fuel lid opening/closing detection switch 76 that the fuel lid 58 has been closed, the on-board device 16 switches the buzzer 34 from the non-operable state to the operation stand-by state.

(2-2) Next, reference will be made to conditions "e", "f" and "g" for switching the state of operation of the buzzer 34 from the non-operable state to the operation stand-by state. In this case it is optional whether the success of mutual authentication with the portable electronic key 12 is to be made a precondition or not.

"e". The case where the on-board device 16 detects that the main switch 20 has been switched from the OFF position (unlocking position) to the LOCK position (locking position).

"f". The case where it is detected by the seat opening/closing detection switch 70 or the console box opening/closing detection switch 72 that the seat 42 or the console box 52 has been closed (locked) by the user.

"g". There case where the seat 42 or the console box 52 has not been locked even with the lapse of a predetermined time after unlocking thereof, as described above.

According to this embodiment, as described above, when the on-board device 16 detects that any of such user operation means as the main switch knob 20, the seat unlocking switch 56, or the console box unlocking switch 54 has been operated, the on-board device 16 communicates with the portable electronic key 12 and, upon success of mutual authentication, switches the buzzer 34 as the warning device into the operation stand-by state of the non-operable state in accordance with the contents of the operation of the user operation means. Thus, when the user who carries the regular portable electronic key 12 does not want operation of the buzzer 34, the buzzer can be switched to the non-operable state positively. Moreover, when the user who carries the regular portable electronic key 12 wants to bring the state of operation of the buzzer 34 into the operation stand-by state, it is possible to positively switch the buzzer 34 to the operation stand-by state.

While a working example of the present invention has been described above, the present invention is not limited to the working example described above, but various design alterations may be carried out without departing from the present invention as set forth in the claims.

What is claimed, is:

1. A theft deterrent system for a vehicle, the theft deterrent system comprising:
  a vehicular electronic key system, the vehicular electronic key system comprising:
    an on-board device, comprising an electronic device, and
    a portable electronic key for communicating with the on-board device and making mutual authentication therewith,
  the theft deterrent system further comprising:
  a warning device operatively connected to the on-board device, and
  a user operation switch operatively connected to the on-board device and adapted to be operated by a user for performing a predetermined switching operation, wherein the system is configured such that when the on-board device detects that the user operation switch has been operated, the on-board device communicates with the portable electronic key and, upon success of mutual authentication, switches the warning device into one of an armed operation stand-by state and an non-operable state in accordance with a user selected position of the user operation switch.

2. The theft deterrent system for a vehicle according to claim 1, wherein the user operation switch comprises a knob-integrated type main switch capable of being switched between a knob locking position and a knob unlocking position by operation of a knob, and when the on-board device detects a switched operation of the knob from the locking position to the unlocking position, the on-board device switches the warning device from the armed operation stand-by state to the non-operable state.

3. The theft deterrent system for a vehicle according to claim 1, wherein the user operation switch comprises at least one of a motorcycle's seat unlocking switch and a motorcycle's console box unlocking switch, and when the on-board device detects that at least one of the seat unlocking switch and the console box unlocking switch has been operated, the on-board device switches the warning device from the armed operation stand-by state to the non-operable state.

4. The theft deterrent system for a vehicle according to claim 3, wherein when the unlocked state has continued for a predetermined time after the warning device has been switched from the armed operation stand-by state to the non-operable state, the on-board device again switches the warning device from the non-operable state to the armed operation stand-by state.

5. The theft deterrent system for a vehicle according to claim 1, wherein the user operation switch comprises a fuel lid unlocking switch of a motorcycle, and when the on-board device detects that the fuel lid unlocking switch has been operated, the on-board device switches the warning device from the armed operation stand-by state to the non-operable state.

6. The theft deterrent system for a vehicle according to claim 1, wherein the user operation switch comprises an engine stop switch of a motorcycle, and when the on-board device detects that the engine stop switch has been turned ON, the on-board device switches the warning device from the operation stand-by state to the non-operable state.

7. The theft deterrent system for a vehicle according to claim 1, wherein when switching the warning device from the armed operation stand-by state to the non-operable state, the on-board device stops the supply of electric power to the warning device.

8. The theft deterrent system for a vehicle according to claim 1, wherein when switching the warning device from the armed operation stand-by state to the non-operable state, the on-board device transmits a warning cancel code to the warning device.

9. A theft deterrent system for a vehicle, the theft deterrent system comprising:

a vehicular electronic key system, the vehicular electronic key system comprising
an on-board device comprising an electronic device, and
a portable electronic key, the portable electronic key adapted to permit two-way communication with the on-board device, and to make mutual authentication therewith, the vehicular electronic key system further comprising
a warning device operatively connected to the on-board device, the warning device comprising an alarm signal generator selected from the group consisting of audible sound-generating devices, light-emitting devices, and combinations thereof,
a vibration sensor for sensing a level of vibration, and
a user operation switch operatively connected to the on-board device and adapted to be operated by a user for performing a predetermined operation, the user operation switch operable to switch the warning device between a non-operable state and a armed standby state in which the warning device is operable to output a warning signal in response to the vibration sensor detecting a vibration of a predetermined value or larger,
wherein the system is configured such that when the on-board device detects that the user operation switch has been operated,
the on-board device communicates with the portable electronic key,
the portable electronic key authenticates the communication from the on-board device and upon success of the authentication sends a reply communication to the on-board-device,
then the on-board device authenticates the reply communication and, upon success of the authentication, switches the warning device into one of the armed operation stand-by state and the non-operable state in accordance with a user-selected position of the user operation switch.

10. The theft deterrent system for a vehicle according to claim 9, wherein the user operation switch comprises a knob-operated main switch capable of being switched between a knob locking position and a knob unlocking position by operation of a knob, and when the on-board device detects a switched operation of the knob from the locking position to the unlocking position, the on-board device switches the warning device from the armed operation stand-by state to the non-operable state.

11. The theft deterrent system for a vehicle according to claim 10, wherein the on-board device comprises a vehicle lock mechanism, and wherein the knob of the main switch is switchable between the following positions:

a lock position which corresponds to a locked condition of the vehicle lock mechanism,
a push position in which the knob is depressed, the push position corresponding to a condition in which two-way authentication communication between the portable electronic key and the on-board device is performed,
an off position which corresponds to an off condition of a vehicle engine, wherein the knob is permitted to move to the off position when the portable electronic key is authenticated, and
an on position which corresponds to an on condition of the vehicle engine.

12. The theft deterrent system for a vehicle according to claim 9, wherein the on-board device comprises a vehicle lock mechanism, an on-board ultra-high frequency (UHF) receiver, an on-board low frequency (LF) transmitter, and an electronic control unit (ECU), and wherein the portable electronic key comprises an ECU, an ON/OFF switch, an LF receiver which receives LF transmissions from the on-board device, and a UHF transmitter which transmits UHF transmissions to the on-board device.

13. The theft deterrent system for a vehicle according to claim 12, wherein the on-board LF transmitter transmits in a horizontal range of 0.8 meters, and in a vertical range of 0.6 meters, relative to a transmitting origin centered on the on-board LF transmitter.

14. The theft deterrent system for a vehicle according to claim 12, wherein a communication distance range in which transmission from the portable electronic key UHF transmitter and reception by the on-board UHF receiver is permitted is approximately 2.5 meters.

15. A method of using a theft deterrent system, the theft deterrent system comprising:
- a vehicular electronic key system, the vehicular electronic key system comprising
  - an on-board device comprising an electronic device, and
  - a portable electronic key for communicating with the on-board device and making mutual authentication therewith,
- the theft deterrent system further comprising a warning device operatively connected to the on-board device; and
- a user operation switch connected to the on-board device and adapted to be operated by a user for performing a predetermined switching operation,
- wherein the method for deterring vehicle theft comprises the following method steps:
  - monitoring the user operation switch using the on-board device to determine whether the user operation switch has been operated,
  - performing mutual authentication when the on-board device detects that the user operation switch has been operated such that the on-board device communicates with the portable electronic key which authenticates the transmission from the on-board device and, upon success of the authentication, the portable electronic key communicates with the on-board device which authenticates the transmission from the portable electronic key, and
  - switching the warning device into one of an armed operation stand-by state and an non-operable state in accordance with a user-selected position of the user operation switch when mutual authentication is successful.

16. The theft deterrent system for a vehicle according to claim 1, further comprising a vibration sensor for sensing a level of vibration, and
- wherein, when the system is in the armed standby state, the warning device is operable to output a warning signal in response to the vibration sensor detecting a vibration of a predetermined value or larger.

* * * * *